INVENTORS J. P. FORDE
L. HOCHGRAF
BY R. B. Ardis
ATTORNEY

July 29, 1969 J. P. FORDE ET AL 3,458,661

ARRANGEMENT FOR PROVIDING PARTIAL SERVICE ON A FAILED SERIALLY LOOPED CARRIER SYSTEM

Filed June 21, 1966 2 Sheets-Sheet 2

United States Patent Office 3,458,661
Patented July 29, 1969

3,458,661

ARRANGEMENT FOR PROVIDING PARTIAL SERVICE ON A FAILED SERIALLY LOOPED CARRIER SYSTEM

John P. Forde, Leonardo, and Lester Hochgraf, Wall Township, Monmouth County, N.J., assignors to Bell Telephone Laboratories, Incorporated, Murray Hill, Berkeley Heights, N.J., a corporation of New York Filed June 21, 1966, Ser. No. 559,195
Int. Cl. H04j 1/02, 3/02
U.S. Cl. 179—15 7 Claims

ABSTRACT OF THE DISCLOSURE

A serially looped carrier system in which a multiplicity of carrier terminals at different locations are linked to an office terminal to provide for derived transmission circuits which allow transmission from the office terminal to each of the remote terminals and from each of the remote terminals back to the office terminal, including means to detect the malfunctioning of carrier terminals and means to bypass same.

In a serially looped carrier system an office terminal is linked to a number of serially connected remote terminals to provide for transmission channels between the office terminal and each of the remote terminals. Each of such remote terminals may provide one or more carrier derived circuits which appear on input and output terminals at both the office terminal and the remote terminals. Information to be transmitted from a particular circuit input terminal at the office terminal to the corresponding output terminal at a remote terminal may, for instance, be inserted in a time slot of a time-division carrier system or in an allocated frequency band of a frequency division carrier system. The information is extracted at the remote terminal from the carrier line and after decoding or demodulation is transmitted to the derived circuit output terminals. Likewise, information to be transmitted from a remote terminal to the office terminal is inserted into the same or a different time slot or is modulated into the same or a different frequency band and then put on the carrier line in the same direction as transmission from the office terminal. This signal, together with the other signals, traverses the remainder of the carrier line and at the farthest terminal is returned to the office terminal on an inward carrier line.

This looped arrangement provides an extremely flexible and economical way for providing connections from an office terminal to a multiplicity of distributed remote terminals without the need for a multiplicity of carrier lines connecting the office terminal and each remote terminal. The carrier channels may be permanently assigned to a particular derived circuit or may be allocated to a derived circuit only for the duration of a connection. In the interest of simplicity the further description of this invention will be applied to a time-division carrier sys tem, but the principles described herein may also be applied to a frequency division serially looped system by means apparent to those skilled in the art.

A severe limitation of such a serially looped system is the interruption of service for the entire system by a failure of transmission at any point in the loop. This characteristic of complete failure is compounded in those installations in which power to energize the line repeaters is transmitted over the same or different conductors in the same cable which is used to transmit the carrier signals. Specifically, failures may occur which interrupt transmission on the loop without interrupting the flow of power on the line conductors. Other kinds of failure may interrupt the flow of power on the line, thus shutting down transmission over the whole loop.

An object of this invention is to eliminate transmission failure of the entire serially connected carrier system caused by any type of localized line or equipment failure at a point remote from the office terminal.

A further object of the invention is to prevent the failure of the entire carrier system due to the failure of an individual remote terminal.

Another object of the invention is to restore service automatically to that part of the loop which is still intact between the office terminal and the remote terminals on the office side of the fault.

A still further object of the invention is to facilitate the location of faulty elements in a serially looped carrier system when a failure occurs.

The present invention fulfills all of these objects without the necessity for additional communication links, other than those already available within the looped carrier system. To do this, the invention provides failure sensing apparatus and command circuitry at the central office terminal and switching arrangements at the remote terminals. The switching arrangements associated with particular remote terminals may take the form of remote terminal bypass circuits and loop-back circuits. In response to a failure in any section of the carrier system the central office terminal issues a command signal either to bypass a faulty remote terminal, thereby excluding the faulty terminal and restoring service to the rest of the carrier system, or to loop back the outward line to the inward line at a remote terminal on the office side of the sensed fault, thereby isolating the carrier section containing the fault and restoring the looped part of the carrier system to service.

More specifically, in the type of serially looped carrier systems to which the invention relates, a central office terminal transmits information to a number of remote terminals which are serially connected together with required line repeaters in one leg of the loop, namely the outward line. The carrier loop is then completed by means of a second leg, the inward line, which connects the last remote station back to the office terminal through a required number of line repeaters. The two parallel legs of the loop complete the transmission path from the central office terminal through the remote terminals and line repeaters back at the office.

Failures that may occur in such carrier systems are of two general types: (1) transmission failures, i.e., message transmission ceases while system power is not interrupted, and (2) system power failures which necessarily cause a transmission failure too. It is evident that any failure along the loop could disable the entire loop, since such failure interrupts the series carrier system.

In order to prevent the failure of the entire serially looped carrier system as a result of such failure at any one point, the present invention provides remote terminal bypass switches and interposes loop-back switches in the carrier loop, all of which are activated by command signals in response to failure sensing apparatus located at the office terminal. The out-of-synchronization detector associated with presently existing office terminal equipment may be readily utilized as the failure sensing apparatus, since either a carrier system transmission failure or power failure results in a loss of synchronization and, hence, a failure indication. The output signals from the failure sensing apparatus are in turn directed to a command logic and fault indicating circuit within the office terminal to originate command signals for transmission over the carrier loop command channel to activate the loop-back or bypass switches in sequence starting with the farthest remote terminal. The activation of a particular bypass switch causes a respective faulty remote terminal to be bypassed thereby providing for continuing carrier service for the remainder of the carrier loop excluding the faulty remote terminal. The energization of a loop-back switch, on the other hand, disconnects the section of the carrier loop that contains the fault and loops back the outward line to the inward line through the loop-back switch to complete a partial carrier loop, whereby service is restored to that part of the carrier system which is located between the particular loop-back switch that has been activated and the central office terminal.

As each remote terminal is bypassed in sequence, information is obtained regarding the location of the fault. If synchronization is restored after the most remote terminal is bypassed, that terminal or section of the loop is the source of the trouble. If synchronization remains lost, a command signal is directed to the next loop-back or bypass switching apparatus, and so on until synchronization is restored. The loop-back or bypass switch which restores synchronization provides an accurate indication of the section of the carrier loop which contains the fault.

In a serially looped carrier system, power for the remote terminals is generally provided for at the location of the particular remote terminal. Power for the line repeaters located along the carrier loop, on the other hand, may be either supplied from a respective preceding remote terminal for line repeaters located between two remote terminals, or from the office terminal for all line repeaters by serially interconnecting all of these repeaters. When the carrier loop employs sectional powering for its repeaters the loop-back arrangement provides only for a signal loop-back, since the several power sections of the loop are isolated. When, on the other hand, the repeaters in the carrier system are serially powered from the central office terminal, each loop-back circuit must, in addition to the signal loop, provide for a power circuit closure order to complete the power path for the line repeaters within the restored partial carrier loop.

The present invention provides a versatile fault identification and restoral system which maintains the partial operation of a serially looped carrier system in case of a localized power failure as well as in the case of a transmission fault.

The above and other features of the invention may be more fully understood from the following detailed description. In the drawings.

Figure 1:
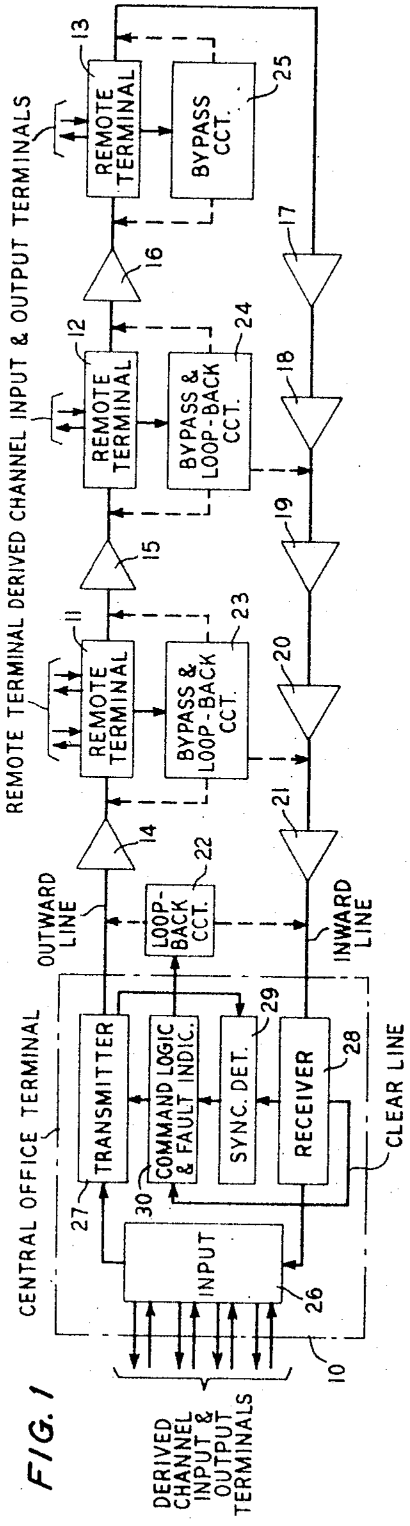
FIG. 1 is a block diagram of a specific embodiment of the invention using bypass and loop-back circuits associated with respective remote terminals in a series carrier loop.
Figure 3:
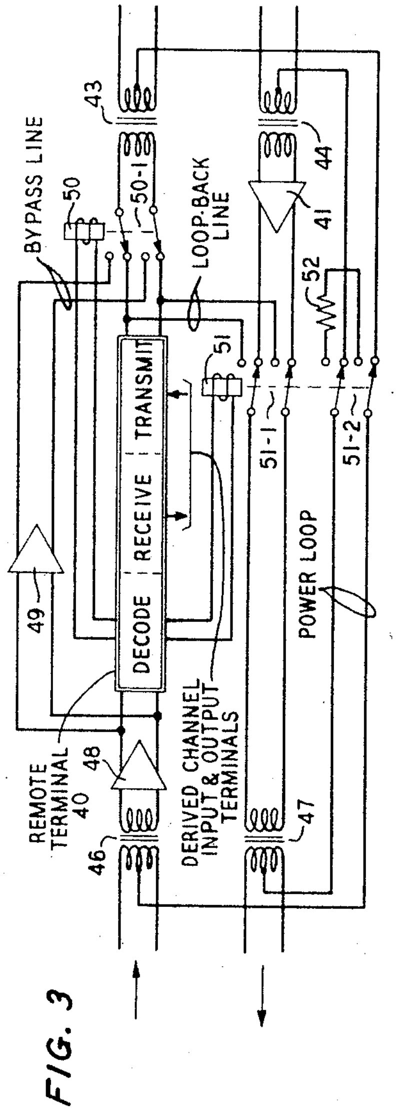
Figure 4:
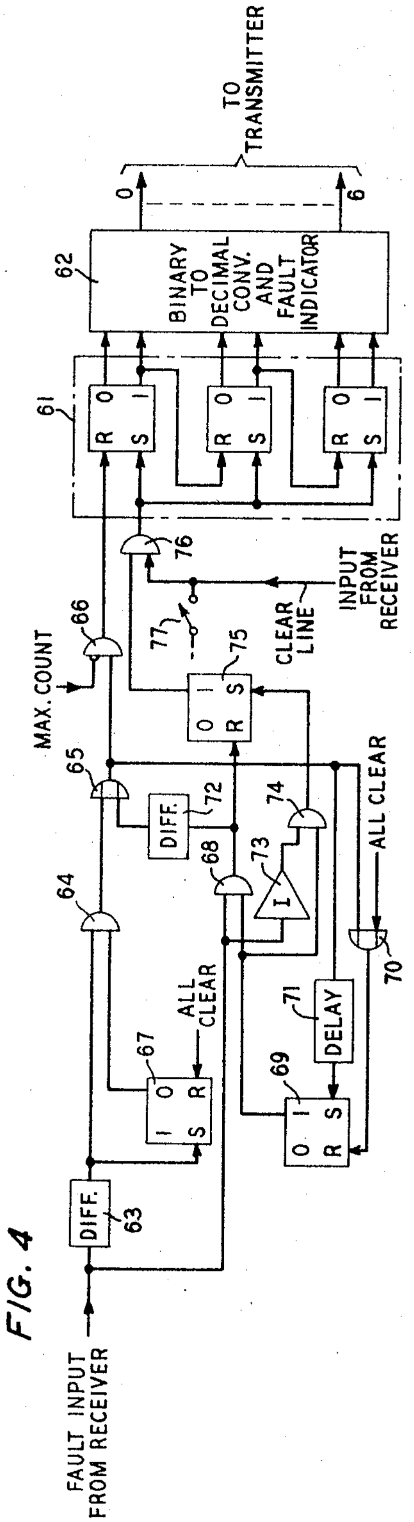

FIG. 3 is a block diagram of another bypass/loop-back arrangement that may be used in the embodiment of the invention of FIG. 1 in conjunction with a carrier system in which all line repeaters are serially powered from the office terminal; and FIG. 4 is a block diagram of the fault indicating and command logic circuitry located at the central office terminal of the embodiment of the invention of FIG. 1.

The serially looped time-division carrier system illustrated in FIG. 1 originates and terminates in a central office terminal 10. A plurality of carrier derived circuits have input and output connection terminals on office terminal 10. The other ends of the corresponding derived circuits are distributed among remote terminals 11, 12, and 13, each of which may provide for and have connections to one or more of the carrier derived circuits. The series carrier loop comprises central office terminal 10, remote terminals 11, 12, and 13, together with line repeaters 14 through 21, loop-back circuit 22, bypass and loop-back circuits 23 and 24, and bypass circuit 25. The carrier loop may be divided into two distinct legs, namely, an outward line and an inward line. The outward line originates at the output of central office terminal 10 and comprises the serially connected remote terminals 11 through 13 together with line repeaters 14, 15, and 16 which are interposed between terminals to recover and regenerate the pulse signals transmitted between the respective terminals. The inward line, on the other hand, runs parallel to the outward line and connects the output of the last remote terminal of the outward line, namely remote terminal 13, back to the input of central office terminal 10. Line repeaters 17 through 21 are serially connected in the inward line to maintain the proper signal level in the return loop. Loop-back circuit 22 provides for loop-back facilities across the output of and the input to central office terminal 10 to check the operation of the central office terminal. Bypass and loop-back circuits 23 and 24 are associated with remote terminals 11 and 12, respectively. They provide for the required bypass circuitry to bypass their respective remote terminal in case of remote terminal failure; they allow, in addition, the required looping back that bridges the outward line and inward line of the carrier loop in response to a carrier system failure in the part of the carrier loop following the particular loop-back circuit. Bypass circuit 25, on the other hand, provides for the required bypass circuitry to bypass remote terminal 13 in case of its failure. Central office terminal 10, which ties in the series carrier loop to external carrier systems through input unit 26 includes, in addition to transmitter 27 and receiver 28 with its associated synchronization detector 29, a command logic and fault indicating circuit 30. The latter circuit generates the required command signals to activate specific loop-back or bypass circuits within the carrier loop and renders a fault indication by registering which of the specific loop-back or bypass circuits are energized.

In the operation of the carrier system, each derived circuit inserts information in an assigned time slot of the time-division carrier system and extracts this information at the remote terminal for transmission to the derived circuit output terminal. The remote terminal encodes and inserts information from the input line of the derived circuit into the same or a different time slot in the carrier signal, transmitting it on the outward line. This carrier signal then traverses all the remaining remote terminals and line repeaters and is returned to the office terminal on the inward carrier line. Within the carrier stream a command channel is also provided for. Command signals originating at the central office terminal are transmitted over the command channel and are directed to specific remote terminals to direct the desired operation of bypass and loop-back circuits associated with such remote terminal.

It is evident from FIG. 1 that an interruption of the series carrier system at any one point of the loop disrupts service of the entire loop. Loop-back and bypass circuits 23 and 24, and bypass circuit 25 are therefore provided for in the present invention to eliminate such failure of the entire carrier system resulting from a localized failure along the carrier loop. When, for example, a failure occurs in remote terminal 12, the bypass circuit of loop-back and bypass circuit 24 energizes to bypass the faulty remote terminal, thereby restoring service to the remainder of the carrier loop by eliminating remote terminal 12 from the loop. Similarly, when a failure occurs at line repeater 16 for instance, the bypass circuitry and the loop-back circuitry of bypass and loop-back circuit 24 energizes to loop back the output of remote terminal 12 from the outward line back to the inward line on the central office side of line repeater 18, thereby restoring service to the partial loop comprising central office terminal 10, remote terminals 11 and 12, and line repeaters 14, 15, 19, 20, and 21. The bypass circuit portion of bypass and loop-back circuit 24, on the other hand, provides for the application of the carrier signal to the part of the carrier loop containing the fault; this carrier signal can be utilized as test signal to aid in the restoration of the system.

Figure 2:
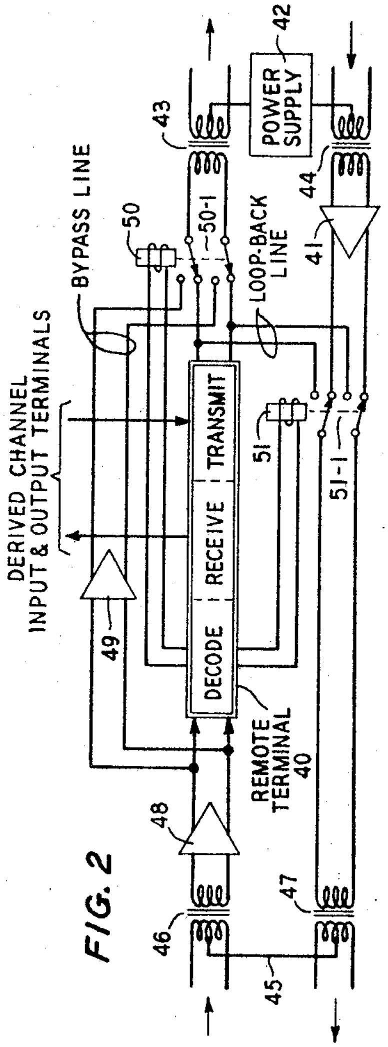
FIG. 2 is a block diagram of one particular bypass/loop-back arrangement used in the embodiment of the invention of FIG. 1 in conjunction with a carrier system using sectional powering for its line repeaters.

FIG. 2 shows a block diagram of one particular bypass and loop-back circuit that may be used in the embodiment of the invention of FIG. 1. The circuit is associated with a remote terminal 40 and provides in addition to a bypass arrangement for the remote terminal for a loop-back arrangement to loop back the outward line just past remote terminal 40 to the inward line just following line repeater 41. The loop-back and bypass circuit of FIG. 2 is adapted to a carrier system in which the individual remote terminals are powered locally and in which the line repeaters between terminals are powered from power supplies that are located at a respective preceding terminal. Using the bypass and loop-back circuit of FIG. 2 in the embodiment of the invention of FIG. 1, three sectional line repeater power loops are being created. The first section comprises line repeaters 14 and 21 powered from central office terminal 10; the second section comprises line repeaters 15 and 19 powered from remote terminal 11; and the third section comprises line repeaters 16 and 17 powered from remote terminal 12. Line repeaters 18 and 20 are powered locally from the respective remote terminal with which they are associated.

In the circuit of FIG. 2 power supply 42 supplies power for the line repeaters of the next following section through the center taps of transformers 43 and 44. The power path for the line repeaters of the preceding section is completed through lead 45 which interconnects the center taps of transformers 46 and 47. The remote terminal circuitry is thereby effectively isolated from the remainder of the loop. The incoming carrier signal is applied through transformer 46 to line repeater 48, which removers and regenerates the signal to be applied in parallel to remote terminal 40 and line repeater 49. During normal carrier system operation, the entire series carrier loop is in operation and bypass relay 50 as well as loop-back relay 51 are de-energized. The output of remote terminal 40 is therefore connected through relay contacts 50–1 of bypass relay 50 to the outward line of the carrier loop, whereas the output of line repeater 49 remains disconnected from the carrier loop. Similarly, the loop-back line remains disconnected from the inward line of the loop, and the carrier loop remains completed through line repeater 41 and through relay contacts 51–1 of loop-back relay 51.

When, on the other hand, a remote terminal bypass is ordered through the command channel, such command signal is received and decoded in the decoder section of remote terminal 40. As a result, the decoder section energizes relay 50, thereby bypassing the remote terminal circuitry exclusive of the decoder, to substitute the output of line repeater 49 for the output of remote terminal 40 as input to outward line signal transformer 43. Since a remote terminal is most likely to fail in that part of its circuitry that has been bypassed, namely the receive and transmit section, the instant bypass arrangement provides for the restoration of carrier service in the remainder of the carrier loop notwithstanding a fault in the bypassed portion of the particular remote terminal.

In case of a carrier loop failure on the loop side of remote terminal 40 of FIG. 2, a loop-back is ordered through the command channel. Such command signal is received and decoded in the decode section of remote terminal 40, which in turn energizes loop-back relay 51 as well as bypass relay 50. As a result, the inward line and outward line are both interrupted on the loop side of remote terminal 40, and the output of remote terminal 40 is looped back through the loop-back line and loop-back relay 51 to the inward line of the central office terminal side of line repeater 41. This loop-back completes a partial carrier loop between the central office terminal and remote terminal 40 through the loop-back line and loop-back relay 51 and, at the same time, isolates the operative partial loop from the remaining loop containing the fault by opening the normally closed contacts of relays 50 and 51. Through its now closed normally open contacts, bypass relay 50 continues, however, to apply a carrier signal through the bypass line to the remaining loop portion containing the fault. The continued application of this test signal greatly facilitates trouble-shooting procedures, thereby eliminating the necessity of external signal generators.

In the carrier system of FIG. 1 all but the last remote terminal in the loop have associated with them the bypass and loop-back circuits as illustrated in FIG. 2. It is evident from FIG. 1 that the last remote terminal does not require a loop-back circuit. Similarly, at the output of central office terminal 10 only a loop-back circuit is required, which provides for a closed loop right at the output of the central office terminal to check its operation directly, with all of the remaining carrier loop disconnected.

FIG. 3 shows a block diagram of another bypass and loop-back circuit that may be used in the embodiment of the invention of FIG. 1. This particular embodiment of the bypass and loop-back circuit has been adopted to serve a carrier system in which each remote terminal has its own locally derived power source, and in which all of the line repeaters are serially powered from the central office terminal. The circuit of FIG. 3 uses the same numerical designations as used for the circuit of FIG. 2 and the two circuits are identical except that power supply 42 and connecting lead 45 of FIG. 2 have been deleted and have been replaced by a remote terminal power bypass circuit comprising additional relay contacts 51–2 and terminating resistor 52.

The center taps of transformers 43, 46, 44, and 47, respectively, are connected together through the normally closed contacts of the additional set of relay contacts 51–2 of loop-back relay 51. During normal loop operation the line repeater power loop is completed through this power loop and relay contacts 51–2. When, on the other hand, a loop-back command energizes loop-back relay 51, the line repeater power loop for the partial loop preceding the respective remote terminal is completed through relay contacts 51–2 and resistor 52, where resistor 52 simulates the load of the disconnected part of the carrier loop containing the fault.

FIG. 4 is a block diagram of the command logic and fault indicating circuitry 30 associated with central office terminal 10 of the embodiment of the invention of FIG. 1. The command logic circuitry generates the required command signals which are transmitted via transmitter 27 to energize the necessary loop-back or by-pass circuits in the loop for optimum carrier system operation. The indicating circuitry, on the other hand, renders an indication by means of indicating lamps, for example, as to which particular bypass or loop-back circuit is energized. In the series carrier loop of FIG. 1 transmitter 27 transmits carrier signals over the carrier loop from central office terminal 10 to the several remote terminals on the loop. Receiver 28 in turn receives carrier signals that are being transmitted over the loop by the remote terminals back to the central office terminal. Synchronization detector 29, on the other hand, examines the received signal to detect a loss of synchronization where such a loss of synchronization indicates a failure within the carrier loop. In response to such loss of synchronization a fault signal is directed to the command logic and fault indicating circuitry 30 which is represented in block diagram form in FIG. 4, to commence the necessary correction and restoration action.

During normal operation of the carrier loop, binary counter 61 of FIG. 4 is set at "zero" output, thereby generating a "zero" output indication at the binary-to-decimal converter and fault indicator 62. As a result the command signal transmitted over the command channel issues an "all clear" command to the several remote terminals, causing all the loop-back and bypass circuits to be de-energized. When, on the other hand, a fault occurs, for instance in the output section of remote terminal 12 of the carrier system of FIG. 1, the synchronization detector detects such fault and issues a fault signal to the command circuitry. In the command circuitry of FIG. 4 the fault signal is applied through differentiator 63, AND gate 64, OR gate 65, Inhibit gate 66, and binary counter 61 to bniary-to-decimal converter and fault indicator 62 to generate a "1" output. This "1" output in turn generates a bypass command in the command channel to energize bypass circuit 25 of FIG. 1.

The differentiated fault signal output of differentiator 63 is, in addition to being applied to AND gate 64, simultaneously directed to bistable multivibrator 67. Multivibrator 67, originally in the "reset" mode with a "zero" output is being "set" by the fault input to generate a "one" output. However, multivibrator 67 has a built-in delay which prevents the immediate change in output state as a response to the input fault signal. As a result of this delayed action, AND gate 64 is able to pass the initial fault signal applied to it during the delay period of multivibrator 67, but blocks all subsequent fault signals until multivibrator 67 has again been reset by an "all clear" signal.

Since the assumed fault in the carrier system is located in remote terminal 12, the bypass command signal for bypass circuit 25 issued in response to the first fault indication does not remove the failure in the line as indicated by lack of synchronization. In fact, because the failure point precedes remote terminal 13, the issued command most likely never reached remote terminal 13 at all. The fault still remains in the system however, and the synchronization detector continues to sense a loss of synchronization and directs further fault signals to the command circuitry. Whereas AND gate 64 now blocks fault signals because of the "set" mode of multivibrator 67, the fault signals are now being passed by AND gate 68. During the presence of the first fault indication AND gate 68 was blocked because of the "reset" mode of bistable multivibrator 69, which mode had been established as a result of the prior "all clear" signal applied to multivibrator 69 through OR gate 70. However, the output of OR gate 65 is now applied through delay unit 71 to "set" multivibrator 69, thereby allowing AND gate 68 to pass subsequent fault signals. Delay unit 71 delays the setting of multivibrator 69 sufficiently to allow the carrier system to perform the required actions in response to the preceding command signal, before a following fault signal is allowed to pass through AND gate 68.

In the present example the first command signal did not clear the carrier line and, therefore, continuous fault signals are applied to the command circuitry from the synchronization detector. After the prescribed delay of delay unit 71 has elapsed, multivibrator 69 is being "set" and AND gate 68 passes the succeeding fault pulses on through diffentiator 72, OR gate 65, Inhibit gate 66, and binary counter 61 to binary-to-decimal converter and fault indicator 62, to generate and indicate a "two" output. This "two" output in turn generates a loop-back command signal to energize the loop-back circuit of bypass and loop-back circuit 24 of FIG. 1.

Since the stipulated fault is located in the output section of remote terminal 12, this loop-back again fails to clear the line. Further fault signals are therefore generated and applied to AND gate 68, which after the time delay of time delay 71 has again elapsed, allows the continuing fault signals to pass, thereby causing binary-to-decimal converter and fault indicator 62 to reach state "three." The "three" output in turn generates a command signal to energize the bypass circuit of bypass and loop-back circuit 24 of FIG. 1. The decode section of remote terminal 12 receives and interprets the command signal and generates the bypass energizing signal, which bypasses the portion of remote terminal 12 that contained the failure. Carrier service has therefore been restored to the remainder of the carrier system exclusive of the receive and send facilities of remote terminal 12.

Because of the restoration of service, the synchronization detector now issues a no-fault signal to the command circuitry. AND gate 68 blocks the no-fault signal because of the polarity reversal of the signal. However, the no-fault signal is properly inverted in inverter 73 and after the time delay of delay unit 71 has again elapsed, the no-fault signal is allowed to pass through AND gate 74 to "set" bistable multivibrator 75. The output of multivibrator 75 in turn is applied to AND gate 76, which gate is, however, blocked until an "all clear" input is also applied either from the central office or by closing switch 77. The output of binary-to-decimal converter and fault indicator 62 remains therefore fixed at the "three" output, with the resulting bypass condition at remote terminal 12. From the indicator at fault indicator 62 it is evident from the "three" indication that the bypass circuit of bypass and loop-back circuit 24 has been energized, indicating a failure at remote terminal 12. Repair crews may be dispatched to correct the fault. Repair procedures are substantially simplified as a result of the ready location indication of the fault.

The command circuitry of FIG. 4 includes a means by which restoration may be accomplished by applying a "clear" command to AND gate 76. The clear command may either be generated by manually closing switch 77 or it may be obtained from the "clear line" of the central office terminal. The "clear line" signal is generated by operation of a switch in the transmitter at the nearest operating remote terminal in the partially restored loop which forces the contents of the command word transmitted by the central office terminal to be altered in a predetermined manner. The central office terminal receiver detects the difference between the transmitted and received command word and activates the "clear line." Together with the "set" output of bistable multivibrator 75 the "clear" command resets binary counter 61 to "zero" through AND gate 76 and consequently also returns binary-to-decimal converter and fault indicator 62 to "zero" output, the "all clear" state. As a result an "all clear" command is transmitted, removing the bypass or loop-back condition that had been ordered to provide for the partial service during the fault condition.

If the fault has not been successfully cleared prior to the "clear" command, a fault indication will again be received at the central office terminal. The command logic circuitry will advance to the same status it had assumed before the "clear" order had been issued, thereby again restoring a partial service loop.

In the carrier system of FIG. 1 the command circuitry will generally, in response to a fault condition, issue alternate bypass and loop-back commands until the fault has been eliminated. The output of binary-to-decimal converter and fault indicator 62 indicates a specific command signal, which in turn corresponds to a fault location within a particular section of the loop. The circuit of FIG. 4 provides for six particular circuit conditions. However, the carrier system may be readily expanded to accommodate any number of remote terminals. When the command circuitry has reached a maximum count, i.e., loop-back circuit 22 of FIG. 1 has been energized, a maximum count input is applied to Inhibit gate 66 to prevent any further counter activation until the application of a "clear" signal after the removal of the fault in the carrier system.

The present invention provides therefore in a series carrier loop for a versatile and simple fault sensing means together with the capability to bypass faulty remote terminals and isolate carrier loop sections containing a fault, thereby restoring carrier service to that part of the loop that does not contain a fault.

It is to be understood that the embodiment described herein is merely illustrative of the principles of the invention. Various modifications may be made thereto by persons skilled in the art wtihout departing from the spirit and scope of the invention.

What is claimed is:

1. In a serially looped multiplexed carried system interconnecting the output of an office terminal, a plurality of remote terminals, and the input of said office terminal, the serial loop having an outward line serially connecting said remote terminals with the output of the said office terminal and an inward line connecting the output of the one of said remote terminals furthest removed from said office terminal to the input of said office terminal, means at said office terminal to detect a transmission failure occurring anywhere in the serial loop, a plurality of switches each operable to disconnect at least a respectively different one of said remote terminals from the serial loop and to restore the serial loop without the disconnected apparatus, and at least one command channel in said carrier system for transmitting selective operating signals to each of said switches, thereby permitting at least said remote terminals to be disconnected from the serial loop selectively and in sequence until carrier service is restored in the fault-free portion thereof.

2. A carrier system in accordance with claim 1 in which at least some of said switches comprise means to bypass a respective one of said remote terminals.

3. A carrier system in accordance with claim 1 in which at least some of said switches comprise means to loop said outward line back to said inward line on the output side of a respective one of said remote terminals.

4. A carrier system in accordance with claim 1 in which at least some of said switches comprise means to bypass a respective one of said remote terminals and in which at least some of said switches comprise means to loop said outward line back to said inward line on the output side of a respective one of said remote terminals.

5. A carrier system in accordance with claim 4 in which each of said remote terminals includes means to decode said command channel operating signals transmitted from said office terminal, said decode means energizing a respective bypass means in response to a command channel operating signal of a first kind to bypass said respective remote terminal, and said decode means energizing said bypass means and loop-back means together in response to a command channel operating signal of a second kind to produce a loop-back condition at said remote terminal location, whereby the output of said remote terminal furnishes the carrier signal for the restored partial carrier loop through said loop-back means and said bypass means furnishes a carrier test signal to the remainder of the carrier loop.

6. A carrier system in accordance with claim 5 which includes at said office terminal additional means to indicate the operating condition of specific switches associated with said remote terminals, said indicating means being responsive to said transmission failure detecting means.

7. A carrier system in accordance with claim 6 in which each of said remote terminals is locally powered and in which line repeaters spaced between said respective remote terminals are serially powered from said office terminal, including in addition at each one of said remote terminals means to simulate the power load of respective subsequent remote terminals, and means to interrupt the power path of said inward line and said outward line in response to a command channel operating signal and to loop back said outward line power path to said inward line power path through said load simulator, thereby disconnecting power from the loop on the loop-side of said respective remote terminal and restoring power for the line repeaters of the partial loop between said office terminal and said respective remote terminal.

No references cited.

RALPH D. BLAKESLEE, Primary Examiner